Aug. 6, 1929.  A. C. ADAMS ET AL  1,723,116
FAN MOUNTING
Filed Nov. 28, 1927
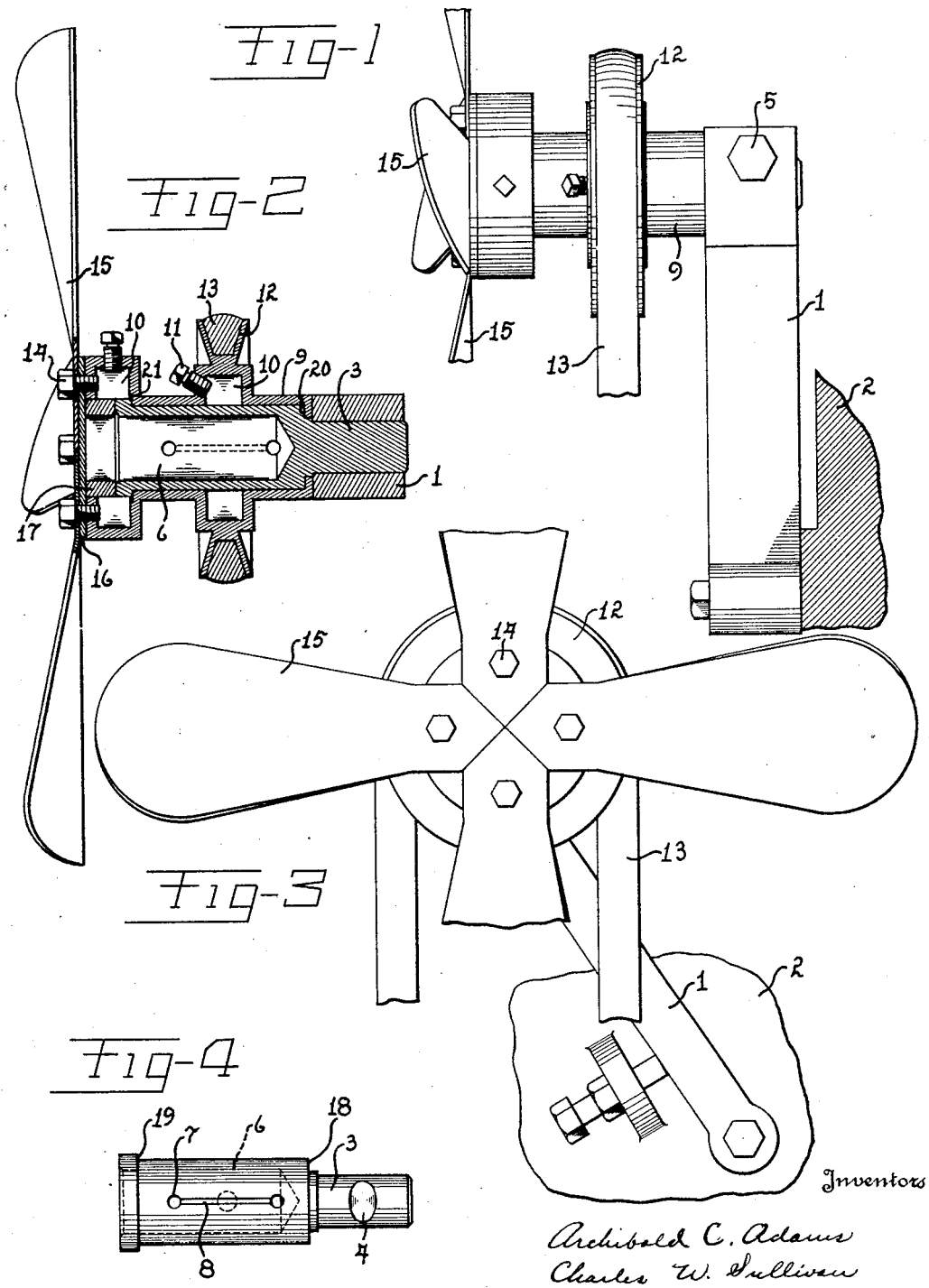

Patented Aug. 6, 1929.

1,723,116

UNITED STATES PATENT OFFICE.

ARCHIBALD C. ADAMS AND CHARLES W. SULLIVAN, OF LIMA, OHIO.

FAN MOUNTING.

Application filed November 28, 1927. Serial No. 236,088.

This invention relates to mountings for fans, but more particularly to fan mountings for automobile engines, and an object of the invention is to provide a simple and efficient mounting of the above type which is sturdy in construction and will satisfactorily operate over an extended period of time. A further object of the invention is to provide a mounting for a fan or other device having adequate provision for lubrication, and which is so designed as to lend itself admirably to quantity production at a minimum cost. Other objects and advantages will appear as the description continues.

The invention is shown by way of illustration but not of limitation, in the accompanying drawing, in which:

Fig. 1 is a side elevation of a fan mounting embodying the invention; Fig. 2 is a longitudinal sectional elevation of the mounting shown in Fig. 1; Fig. 3 is a front face view of the mounting shown in Fig. 1, and Fig. 4 is a side elevation of the bearing pin.

The illustrated embodiment of the invention comprises an arm 1 which is adjustably connected at one end to a support 2 and receives a bearing pin 3 in the opposite end thereof, the bearing pin 3 having a notch 4 to receive a bolt 5 for securely holding the pin in position. The pin 3 is provided with an internal lubricant-receiving cavity or reservoir 6 having ports 7 and an external groove 8 for feeding lubricant to the bearing surface of the pin. As shown, the outer end of the lubricant-receiving cavity 6 is open, thereby enabling the cavity to be readily and conveniently supplied with lubricant.

Journaled on the bearing pin 3 is a rotary member 9 which may be a casting, although the pin may be hardened and ground. Spaced axially on the rotary member 9 are a pair of lubricant-receiving reservoirs 10, which are open to the bearing pin 3 and extend radially of the rotary member 9 beyond the bearing part thereof. Each reservoir is provided with a filling opening closed by a plug 11 so that the reservoirs may be readily filled with lubricant from the outside.

Formed on and extending radially from the inner reservoir is an annular track 12 to receive a belt 13, which may be connected with any suitable source of power, as will be readily understood. The form and construction of the track 12 may be varied as desired according to the form of belt.

Closing the outer end of the rotary member 9 and secured thereto by bolts 14, is a fan 15 which is shown as having a disc 16 connected thereto, but which may be dispensed with or formed integrally with the fan, if desired. Interposed between the end of the bearing pin 3 and the fan unit 15 is a bushing 17, the engagement of the bushing with the bearing pin being in the region of the outer lubricant-receiving reservoir 10. It is apparent that the bushing 17 takes up any thrust exerted by the fan in one direction.

In order to counteract the thrust of the fan unit 15 when in operation, the bearing pin 3 is provided with axially spaced shoulders 18 and 19, against which abut shoulders 20 and 21, respectively, on the rotary member 9. It is apparent that outward thrust exerted by the fan unit 15 is counteracted by the abutments 18 and 19, and 20 and 21 respectively. This provides for an exceptionally smooth running fan free from vibration and designed to operate satisfactorily over an extended period of time.

In order to supply lubricant to the reservoir 6 of the pin 3, it is merely necessary to remove the four bolts 14, and thereby remove the fan unit, rendering the reservoir 6 readily accessible. After the several lubricant-receiving chambers are filled with lubricant, further attention to the mounting is unnecessary for a period of approximately one year.

While we have shown and described one embodiment of the invention, it is to be understood that numerous changes in details of construction and arrangement may be effected without departing from the spirit of the invention, especially as defined in the appended claims.

What we claim as new and desire to secure by Letters Patent is:

1. A fan mounting comprising a bearing pin having an internal lubricant-receiving reservoir in communication with the bearing surface, a rotary member on said pin provided with a lubricant receiving reservoir open to the bearing surface of said pin, a grooved annular track on said member to receive a belt, a fan secured to the outer end of said rotary member, and longitudinally spaced thrust-receiving shoulders on said pin and rotatable member respectively remote from the outer ends thereof for counteracting the thrust exerted by said fan.

2. A fan mounting comprising a bearing pin having an internal lubricant-receiving reservoir in communication with the bearing surface, a rotary member on said pin provided with longitudinally spaced radially extending lubricant-receiving reservoir open to the bearing surface thereof, said pin and rotary member having open outer ends, a grooved track on said member to receive a belt, a fan secured to the outer end of said rotary member closing the open ends of said pin and rotary member and longitudinally spaced thrust-receiving shoulders on said pin and rotary member respectively for counteracting the thrust exerted by said fan.

3. A fan mounting comprising a bearing pin having an internal lubricant-receiving cavity in communication with the bearing surface, a rotary member on said pin provided with axially spaced lubricant-receiving chambers open to said pin, a grooved belt-receiving track on one chamber, each chamber having an external filling opening, means including a fan to close the ends of said rotary member and pin, a bushing interposed between said pin and said closing means, and longitudinally spaced thrust-receiving abutments on said pin and rotatable member respectively for counteracting the thrust exerted by said fan.

In testimony whereof we have hereunto signed our names to this specification.

ARCHIBALD C. ADAMS.
CHARLES W. SULLIVAN.